United States Patent
Dropps et al.

(10) Patent No.: US 7,773,629 B1
(45) Date of Patent: Aug. 10, 2010

(54) METHOD AND SYSTEM FOR NETWORK PORT ADDRESSING

(75) Inventors: Frank R. Dropps, Maple Grove, MN (US); Craig M. Verba, Maple Grove, MN (US); Ernest G. Kohlwey, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 108 days.

(21) Appl. No.: 12/135,973

(22) Filed: Jun. 9, 2008

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/471; 370/389; 370/465; 370/470

(58) Field of Classification Search .......... 370/389, 370/465, 471, 470
See application file for complete search history.

(56) References Cited

U.S. PATENT DOCUMENTS

| 7,512,123 | B1 * | 3/2009 | DeSanti et al. | 370/389 |
| 2003/0204618 | A1 * | 10/2003 | Foster et al. | 709/238 |
| 2005/0213561 | A1 * | 9/2005 | Yao et al. | 370/351 |

* cited by examiner

*Primary Examiner*—Ayaz R Sheikh
*Assistant Examiner*—Tarell Hampton
(74) *Attorney, Agent, or Firm*—Klein, O'Neill & Singh, LLP

(57) ABSTRACT

Method and system for routing Fibre Channel frames is provided. The includes (a) receiving a frame at a port of a switch element; (b) determining if the frame is to be routed using extended area routing; (c) if extended area routing is to be used for routing the frame, identifying a source for obtaining extension bits for expanding an area identification field (Area_ID); and (d) expanding the Area_ID field using the extension bits from the identified source. The system includes routing logic at a port of a switch element for performing the foregoing steps.

20 Claims, 7 Drawing Sheets

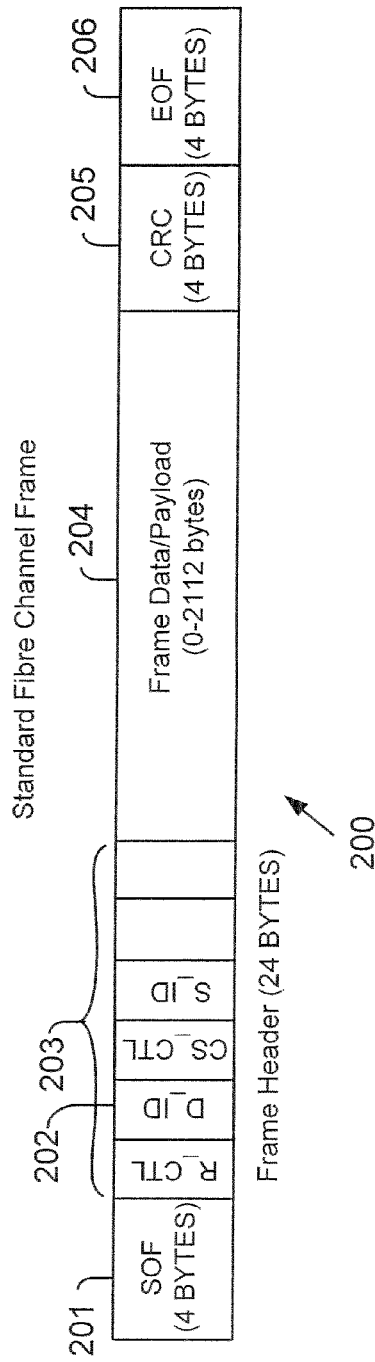

METHOD AND SYSTEM FOR NETWORK PORT ADDRESSING

BACKGROUND

1. Technical Field

The present disclosure relates to networks.

2. Related Art

Networks typically use frames or packets (used interchangeably through out this specification) to send information (or data) between network nodes. A network node is a port for a network device (for example, a switch, host bus adapter and others). A network node that transmits a frame may be designated as a "transmitting node" and a network node that receives a frame may be designated as a "receiving node"

Various network protocols and standards are used for network communication. The protocols and standards provide frame header formats to enable communication between different network ports. An advantage of using standard frame header format is that one can easily recognize and parse network frames. The disadvantage is that often standard frame header formats limit the number of ports that can be addressed at any given time. Therefore, there is a need for a system and method that maintains the use of standard header formats but expands the number of devices/ports one can address.

SUMMARY

In one embodiment, a method for routing Fibre Channel frames is provided. The method includes (a) receiving a frame at a port of a switch element; (b) determining if the frame is to be routed using extended area routing; (c) if extended area routing is to be used for routing the frame, identifying a source for obtaining extension bits for expanding an area identification field (Area_ID); and (d) expanding the Area_ID field using the extension bits from the identified source.

In another embodiment, a Fibre Channel switch element is provided. The switch element includes a port for receiving a frame; and routing logic for: (a) determining if the frame is to be routed using extended area routing; (b) if extended area routing is to be used for routing the frame, identifying a source for obtaining extension bits for expanding an area identification field (Area_ID); and (c) expanding the Area_ID field using the extension bits from the identified source In yet another embodiment, a method for routing Fibre Channel frames is provided. The method includes (a) receiving a frame at a port of a Fibre Channel switch element; (b) determining if extended area routing is used based on the switch element addressing a certain number of ports; (c) if extended area routing is to be used for routing the frame, determining if extension bits from a domain identifier field (Domain_ID) or a port identifier field (Port_ID) are used for expanding an area identification field (Area_ID); and (d) expanding the Area_ID field using the extension bits from the Domain_ID or from the Port_ID.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures:

FIG. 2A shows a block diagram of a Fibre Channel frame format;

FIG. 2B shows a block diagram of Fibre Channel frame header format;

FIGS. 2C and 2D shows block diagrams of frame headers using extension bits, according one embodiment.

DETAILED DESCRIPTION

Definitions

Figure 1A:
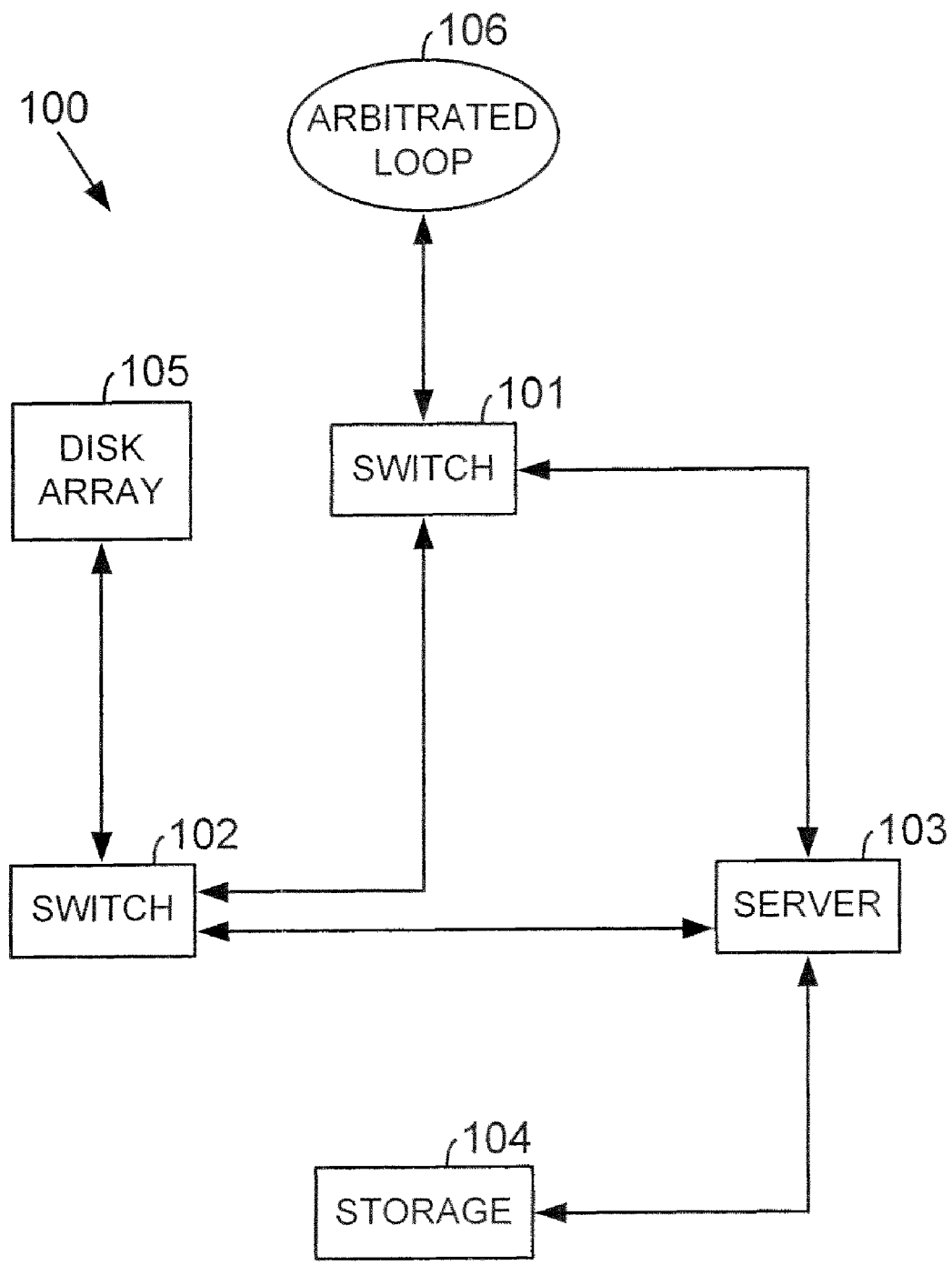
FIG. 1A shows an example of a network system, used according to one embodiment of the present disclosure.

The following definitions are provided as they are typically (but not exclusively) used in the Fibre Channel environment, implementing the various adaptive aspects of the present disclosure.

"D_ID": A part of the standard Fibre Channel header field that includes the destination address for a frame.

"Domain_ID": An 8-bit field included in the D_ID of a frame header. The Domain_ID is a unique value assigned to each switch element using a mechanism described in the Fibre Channel Standard "FC-SW-3", incorporated herein by reference in its entirety.

"E_Port": An expansion port that is used to connect Fibre Channel Switch elements in a Fabric.

"F_Port": A Fabric port to which non-loop N_Ports are attached to a fabric and does not include FL_ports.

"Fibre Channel ANSI Standard" ("FC-FS-2"): The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices, for example, NL_Port, N_ports and others.

"N_Port": A direct fabric attached port, for example, a disk drive or a HBA.

"NL_Port": An L_Port (i.e. loop port) that can perform the function of an N_Port.

"Switch": A fabric element conforming to the Fibre Channel Switch standards.

"NPIV_ID": A virtual identifier that is assigned to a physical port. This allows one to provide more than one unique address the same physical port. In the Fibre Channel environment, NPIV_ID is a unique source or destination address assigned to an N_Port device, supporting N_Port ID virtualization (NPIV) that uses the least significant bits in the S_ID or D_ID.

To facilitate an understanding of the various embodiments, the general architecture and operation of a network system/network switch is described. The specific architecture and operation of the preferred embodiment will then be described with reference to the general architecture.

Storage area networking systems may use standard or proprietary protocols, or a combination thereof, for enabling communication. For example, Fibre Channel, Infiniband ("IB"), Ethernet, Fibre Channel Over Ethernet (FCoE) or any other standard may be used. These standards are incorporated herein by reference in their entirety, where applicable. The following embodiments are described with respect to the Fibre Channel standards; but are not limited to Fibre Channel or any particular standard or protocol.

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel fabric devices include a node port or "N_Port" that manages fabric connections. The N_port establishes a connection to a fabric element (e.g., a switch) having a fabric port or "F_port". Fabric devices may also support expansion ports (E_Ports) between switching elements.

A Fibre Channel switch is a multi-port device where each port manages a point-to-point connection between itself and its attached system. Each port can be attached to a server, peripheral, I/O (input/output) subsystem, bridge, hub, router, or even another switch. A switch receives messages from one port and routes it to another port.

Network System:

FIG. 1A is a block diagram of a network system 100 implementing the methods and systems in accordance with the various embodiments disclosed herein. Network system 100 may be based on Fibre Channel, IB, or any other protocol. As mentioned above, the examples below are described with respect to Fibre Channel but are applicable to Fibre Channel or any other standard.

System 100 includes plural devices that are interconnected. Each device includes one or more ports, classified as for example, node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N_Port in server 103 may establish a path with disk array 105 through switch 102.

Figure 1B:
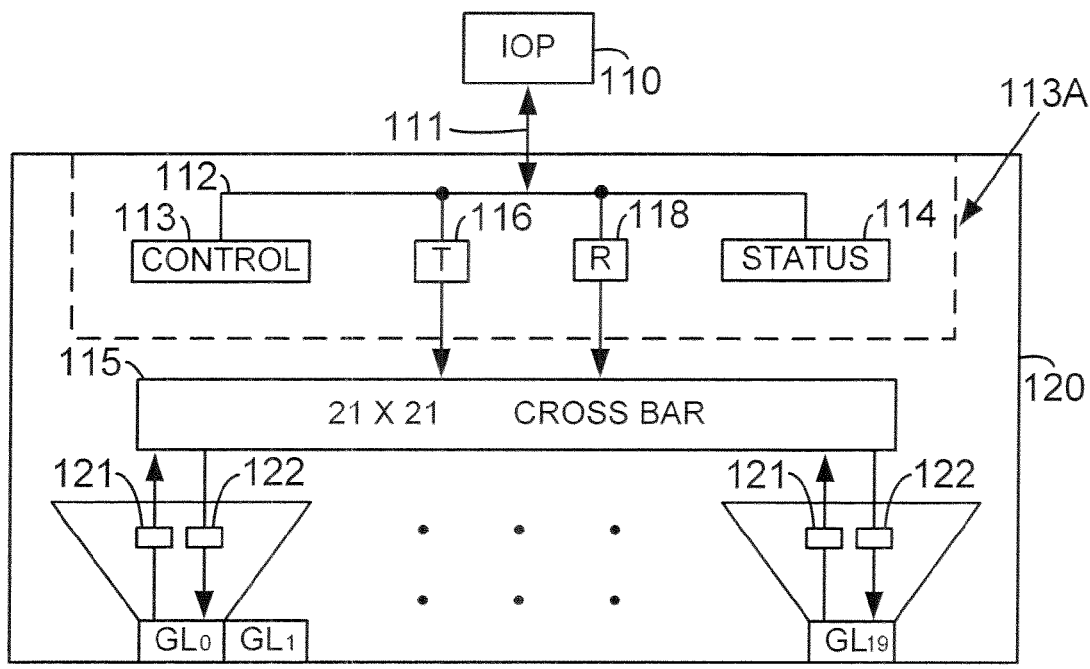
FIG. 1B shows an example of a Fibre Channel switch element, according to one embodiment of the present disclosure.

Switch Element:

FIG. 1B is a block diagram of a 20-port ASIC (Application Specific Integrated Circuit) Fabric switch element, used according to one embodiment. FIG. 1B provides the general architecture of 20-channel switch chassis using the 20-port Fabric element. Fabric element includes ASIC 120 that supports non-blocking Fibre Channel class 2 (connectionless, acknowledged) service and class 3 (connectionless, unacknowledged) service between any ports. It is noteworthy that ASIC 120 may also be designed for class 1 (connection-oriented) service, within the scope and operation of the present embodiment as described herein.

The Fabric element of the present disclosure is presently implemented as a single CMOS ASIC, and for this reason the term "Fabric element" and ASIC are used interchangeably to refer to the preferred embodiments in this specification. Although FIG. 1B shows 20 ports, the present disclosure is not limited to any particular number of ports.

ASIC 120 has 20 ports numbered in FIG. 1B as GL0 through GL19. These ports are generic to common Fibre Channel port types, for example, F_Port, FL_Port and E_Port. In other words, depending upon what it is attached to, each generic port (also referred to as GL Port) can function as any type of port. Also, the GL port may function as a special port useful in fabric element linking, as described below.

For illustration purposes only, all GL ports are drawn on the same side of ASIC 120 in FIG. 1B. However, the ports may be located on both sides of ASIC 120 as shown in other Figures. This does not imply any difference in port or ASIC design. Actual physical layout of the ports will depend on the physical layout of the ASIC.

Each port GL0-GL19 includes transmit and receive connections to switch crossbar 115. Within each port, one connection is through receive buffer 121, which functions to receive and temporarily hold a frame during a routing operation. The other connection is through transmit buffer 122.

Switch crossbar 115 includes a number of switch crossbars for handling specific types of data and data flow control information. For illustration purposes only, switch crossbar 115 is shown as a single crossbar. Switch crossbar 115 is a connectionless crossbar (packet switch) of known conventional design, sized to connect 21×21 paths. This is to accommodate 20 GL ports plus a port for connection to a fabric controller, which may be external to ASIC 120.

In one embodiment, the switch chassis described herein, the Fabric controller is a firmware-programmed microprocessor, also referred to as the input/output processor ("IOP"). As seen in FIG. 1B, bi-directional connection to IOP 110 is routed through port 111, which connects internally to a control bus 112. Transmit buffer ("T") 116; receive buffer ("R") 118, control register 113 and Status register 114 (within block 113A) connect to bus 112. Transmit buffer 116 and receive buffer 118 connect the internal connectionless switch crossbar 115 to IOP 110 so that it can source or sink frames.

Control register 113 receives and holds control information from IOP 110, so that IOP 110 can change characteristics or operating configuration of ASIC 120 by placing certain control words in register 113. IOP 110 can read status of ASIC 120 by monitoring various codes that are placed in status register 114 by monitoring circuits (not shown).

Figure 1C:
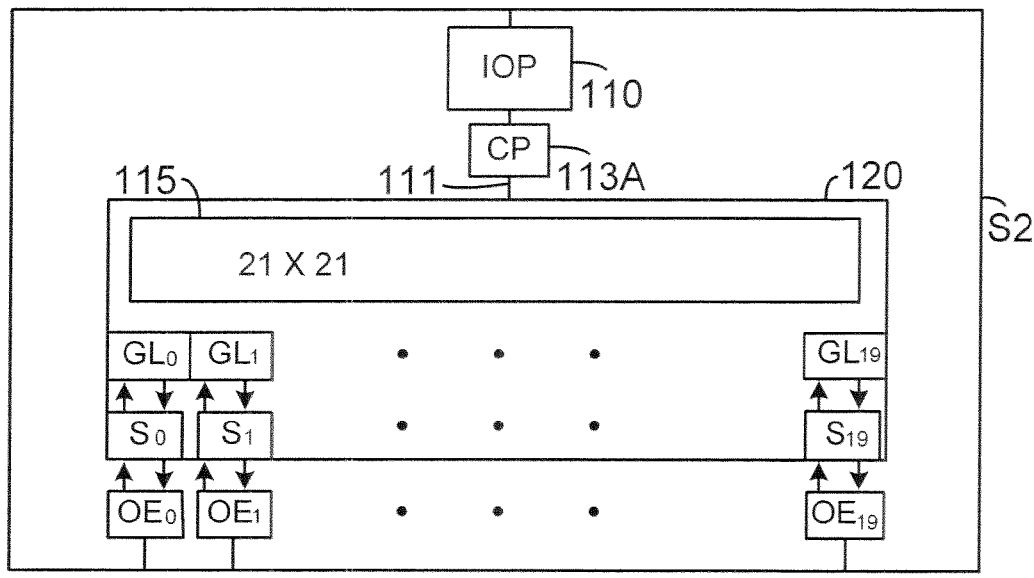
FIG. 1C shows a block diagram of a 20-channel switch chassis, according to one embodiment of the present disclosure.

FIG. 1C shows a 20-channel switch chassis S2 using ASIC 120 and IOP 110. IOP 110 in FIG. 1C is shown as a part of a switch chassis utilizing one or more of ASIC 120. S2 also includes other elements, for example, a power supply (not shown). The 20 GL_Ports correspond to channels (also referred to as "C") C0-C19.

Each GL_Port has a serial/deserializer (SERDES) (also referred to as "S") designated as S0-S19. Ideally, the SERDES functions are implemented on ASIC 120 for efficiency, but may alternatively be external to each GL_Port. The SER- DES converts parallel data into a serial data stream for transmission and converts received serial data into parallel data.

Each GL_Port may have an optical-electric converter, designated as (also referred to as "OE") OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
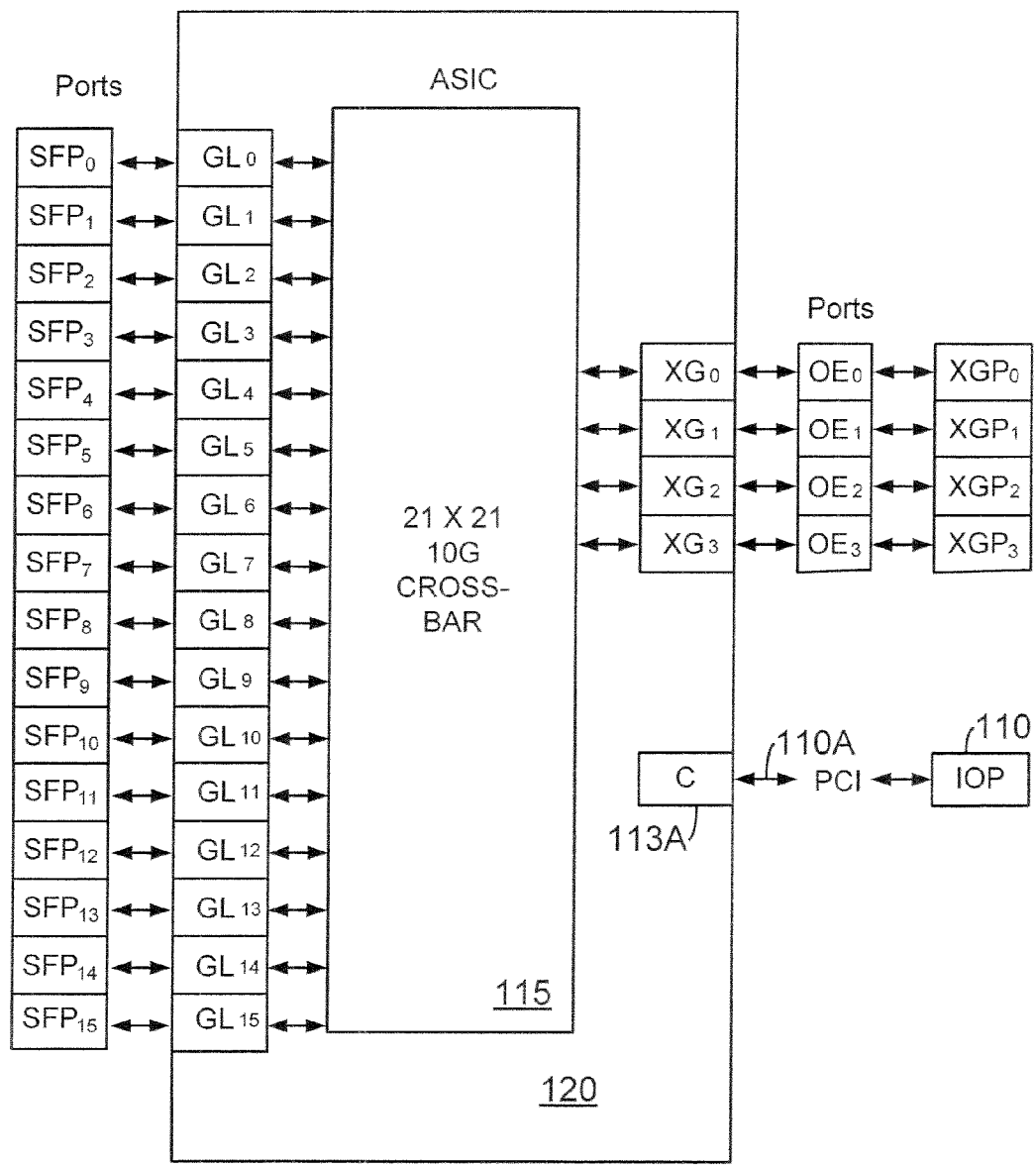
FIG. 1D shows a block diagram of a Fibre Channel switch element, used according to one embodiment of the present disclosure.

FIG. 1D shows a block diagram of ASIC 120 with sixteen GL ports and four high speed (for example, 10/20/40 G) port control modules designated as XG0-XG3 for four high-speed ports designated as XGP0-XGP3. GL ports ($GL_0$-$GL_{15}$) communicate with 1/2/4/8/16G SFP Port modules $SFP_0$-$SFP_{15}$. SFP is a small form factor pluggable optical transceiver. ASIC 120 include a control port 113A (that includes control register 113) that is coupled to IOP 110 through a PCI connection 110A.

Figure 1E:
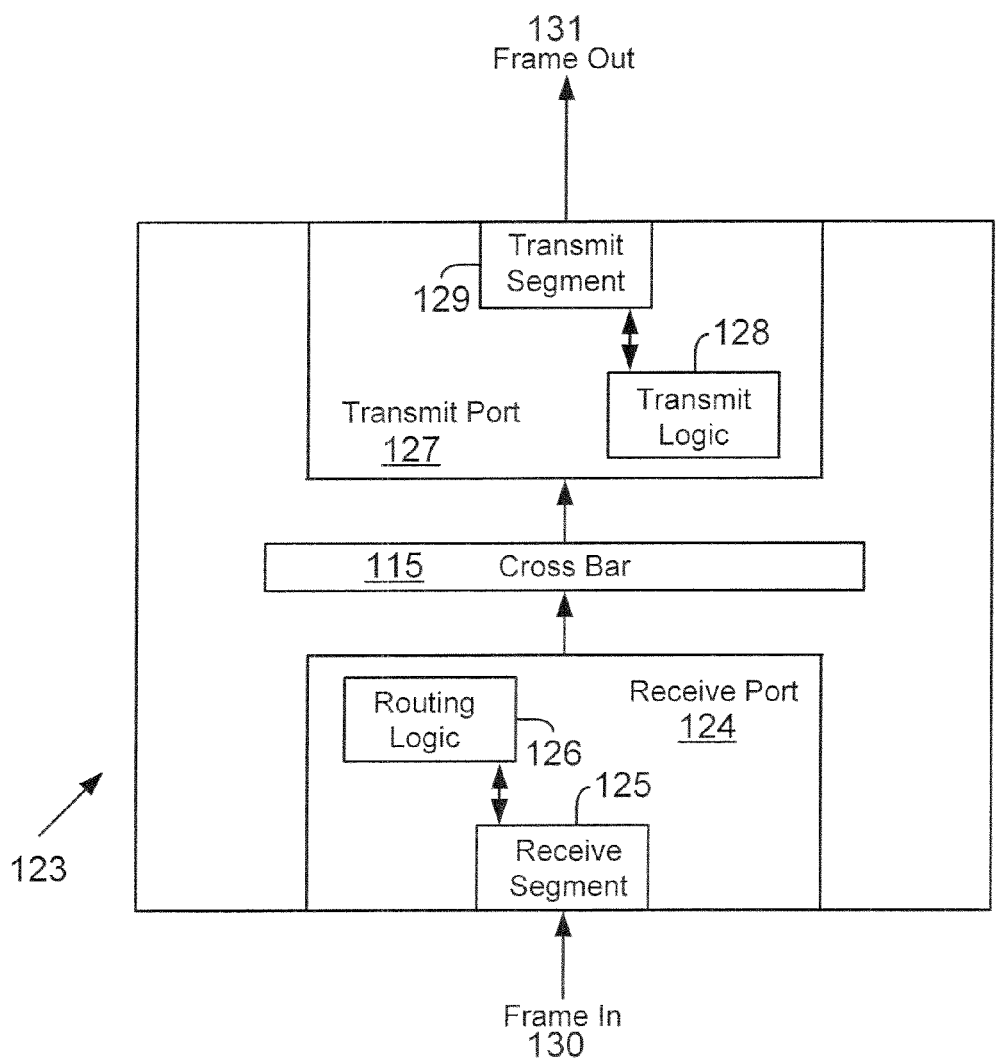
FIG. 1E shows another block diagram of a Fibre Channel switch element, used according to one embodiment of the present disclosure.

FIG. 1E shows an example of a switch element port 12 used for receiving and transmitting Fibre Channel frames. Port 123 includes a receive port 124 and a transmit port 127. Receive port 124 includes receive segment 125 (similar to 118, FIG. 1B) that receives incoming frames 130. The frames are processed and routed by routing logic 126 that routes frames via crossbar 115.

The transmit port includes transmit logic 128 and transmit segment 129 (similar to T 116, FIG. 1B). Frames are processed by transmit logic 128 and then sent to a destination (shown as frame out 131) via transmit segment 129.

Fibre Channel Frame Structure:

FIG. 2A shows the structure of a standard Fibre Channel frame (for example, 130, FIG. 1E) that is received and processed by a Fibre Channel port (for example, 123, FIG. 1E). The Fibre Channel standard, FC-FS-2 (incorporated herein by reference in its entirety) describes the overall frame structure and fields in detail.

A Fibre Channel frame 200 includes start of frame (SOF) (4 bytes) 201 followed by a frame header (24 bytes) 203. Frame data (or payload) 204 follows the frame header 203. Cyclic redundancy code (CRC) 205, which is 4 bytes long, follows the payload 204. CRC 205 is used to check frame data integrity. End of frame (EOF) 206, which is 4 bytes long, follows CRC 205 and indicates the end of a frame.

The frame header 203 includes various fields, for example, R_CTL, D_ID (202), CS_CTL, S_ID and others. CS_CTL provides class specific control/priority, while D_ID and S_ID are address identifiers. R_CTL is a 1-byte field that contains routing bits and information bits to categorize a frame function.

Fibre channel switch addressing is defined by Fibre Channel standards. Typically, a 24-bit identifier (D_ID 202 for destination address, as shown in FIG. 2B) is used to uniquely identify an N_Port device. The 24-bit address includes an 8-bit Domain Identification ("Domain_ID") field (shown as 207, FIG. 2B); an 8-bit Area Identifier (Area_ID) (shown as 208, FIG. 2B) and an 8-bit Port Identifier (Port_ID) (shown as 209, FIG. 2B).

Domain_ID 207 identifies a domain of one or more switches that have the same Domain_ID for all N_Ports and NL_Ports (an N_Port that can perform an Arbitrated Loop function). A domain in the Fibre Channel environment as defined by ANSI Standard X3.289-199X Fibre Channel-Fabric Generic Requirements (FC-FG), incorporated herein by reference in its entirety, is the highest or most significant hierarchical level in a three-level addressing scheme. Typically each domain is a unique switch that may be include one or more switch elements. If there is more than one switch element in a Domain, then each switch element within the domain is directly connected via an inter-switch link ("ISL") to at least another switch element in the domain.

The Area_ID 208 is used for identifying one or more N_Ports within and attached to a single switch or an arbitrated loop of NL_Ports attached to a single FL_Port. The Port_ID 209 is a unique 8-bit value to identify a device within a Fabric. Typically, a Port_ID 209 applies to a single N_Port device within a Domain/Area; or a valid AL_PA (arbitrated loop physical address) of a single NL_Port device.

Extended Area Routing:

Under the standard Fibre Channel addressing scheme, using the 8-bit Domain_ID, 8-bit Area ID and 8-bit Port_ID, one can only address 256 ports (i.e. $2^8$) within a single domain. The embodiment disclosed herein allows one to address more ports by using more bits than the standard 8-bits, as described below with respect to FIGS. 2C, 2D and FIG. 3.

In one embodiment, extra bits (or extension bits) may be used to enlarge the Area_ID field 208. Routing based on the enlarged Area_ID field 208 is referred to as extended area routing. Area routing and extended area routing are used when the Domain_ID field 207 in data packets matches the domain assigned to a switch that is processing a received data packet at any given time.

In one example, instead of using the standard 8 bits, one can extend the Area_ID field 208 by using extension bits. The extension bits may be borrowed from Port_ID 209 or Domain_ID 207, as described below.

FIG. 2C shows extending the Area_ID 208 by using extension bits 210 from Port_ID 209 (See FIG. 2B). The Port_ID 209 is split into two parts, NPIV_ID 211 and extension bits 210. NPIV_ID 211 is assigned to provide a virtual N_Port identifier to the same physical port. Hence, using NPIV_ID 211 can give more than one address to the same physical port.

The extension bits 210 are used to extend the Area_ID 208 from 8 bits to 10 bits. The additional bits allow a switch within a single domain, assigned a single domain value, to increase the number of ports that can be addressed. When the Area_ID field 208 is increased to 10 bits, a switch can address $2^{10}$ or 1024 unique devices. This expanded Area_ID field 210 is compatible with NPIV (N_Port ID Virtualization) and Arbitrated loop device(s) to allow addressing of even more devices.

Figure 2D:
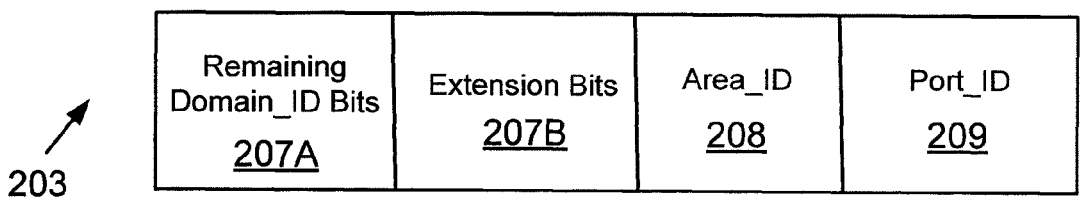

FIG. 2D shows an example of extending the Area_ID 208_bits by using the lower bits of the Domain_ID 207. In this example, the lower Domain_ID bits shown as 207B are the "extension bits" (similar to 210, FIG. 2C). The remaining 6 Domain_ID bits are shown as 207A. In this example, the Port_ID 209 is unchanged.

Figure 3:
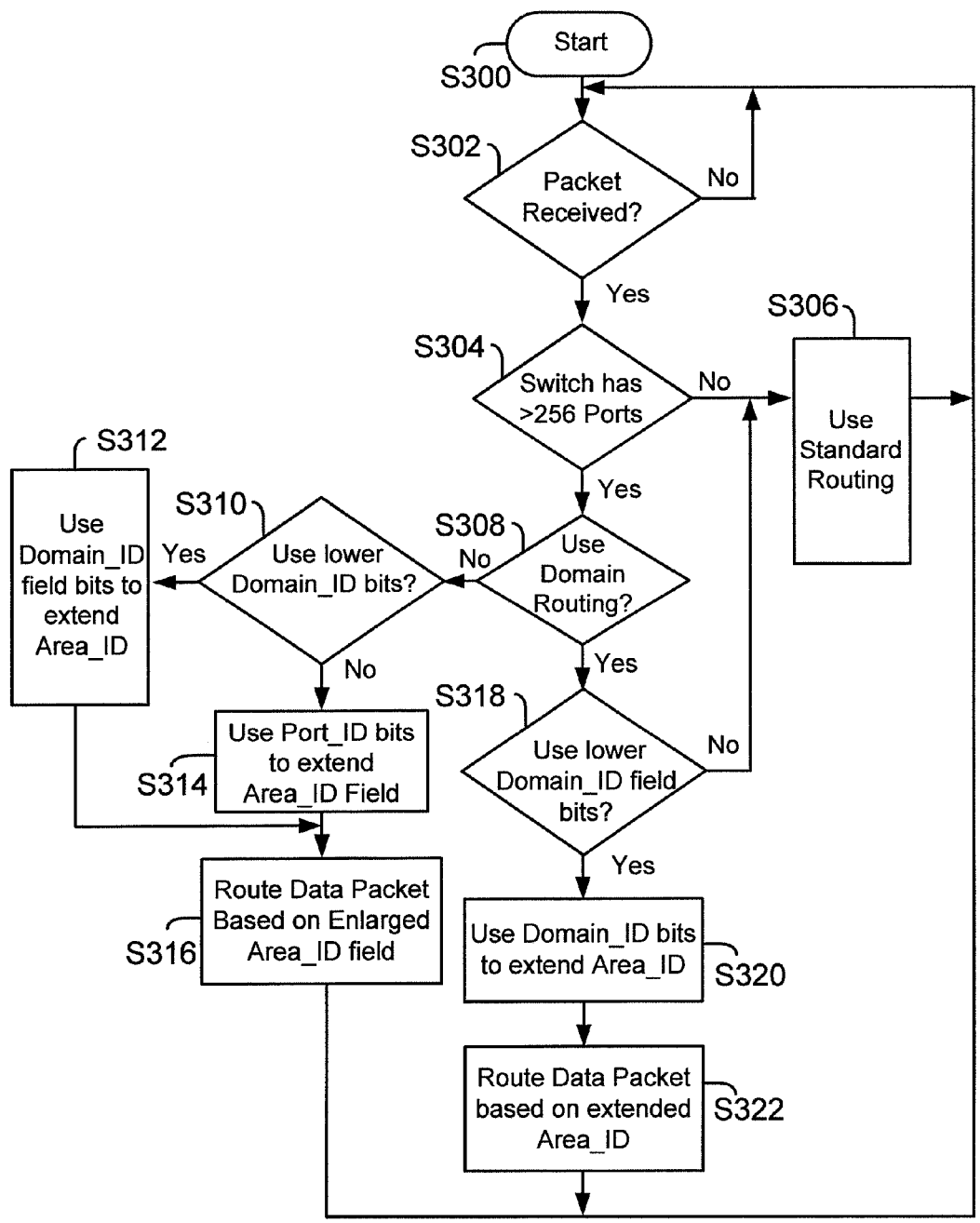

Process Flow:

FIG. 3 shows a process flow for increasing the number of ports that one can address in a Fibre Channel environment, according to one embodiment. The process starts in step S300 when a network switch element and the switch ports are initialized and are functioning.

In step S302 the process determines if a data packet (for example, 130) is received at a port (for example, 124). If a data packet is not received, then the process waits for receiving the data packet. If a data packet has been received, then in step S304, the process determines if the switch has more than 256 ports to address. This decision is made to allow the same flow process to represent switches that differ in the number of ports.

If the number of ports is not greater than 256, then in step S306, the frame is processed using the standard D_ID field 202. Routing logic 126 routes the frame using standard Fibre Channel routing techniques.

If the number of ports is greater than 256 (step S304), then in step S308, the process determines if domain based routing is to be used. Domain based routing is used when the Domain_ID 207 does not match the domain number assigned to a switch that is currently processing an incoming data packet. In other words, the destination N_Port or NL_Port device is connected to a different switch and the data packet first needs to be routed to another switch that has been assigned a domain value that matches the Domain_ID 207 of the data packet.

If domain based routing is not to be used, then in step S310, routing logic 126 determines if the lower D_ID Domain field bits (207B) are to be used to extend the Area_ID 208 (See FIG. 2D). If yes, then in step S312, routing logic 126 extracts extension bits 207B (FIG. 2D) from the Domain_ID to extend the Area_ID field.

If the lower Domain_ID field bits are not used to extend the Area_ID field 208, then in step S314, the Port_ID 209 is parsed. Extension bits 210 are extracted and appended to the standard Area_ID field 208. For example, the extension bits 210 are appended or concatenated to the Area_ID 208. Thereafter, in step S316, the data packet is routed based on the enlarged or extended Area_ID 208.

If Domain based routing is used (step S308), then in step S318, the process determines if the lower Domain_ID field bits are to be used for extended area routing. If not, the process moves to step S306, for standard processing.

If the lower Domain_ID field is used, then in step S320, the Domain_ID field is parsed and the lower Domain_ID field 207 bits are ignored. The lower bits are then used to extend the Area_ID field 208. Thereafter, the frame is routed in step S322, using the extended Area_ID field.

Figure 4:
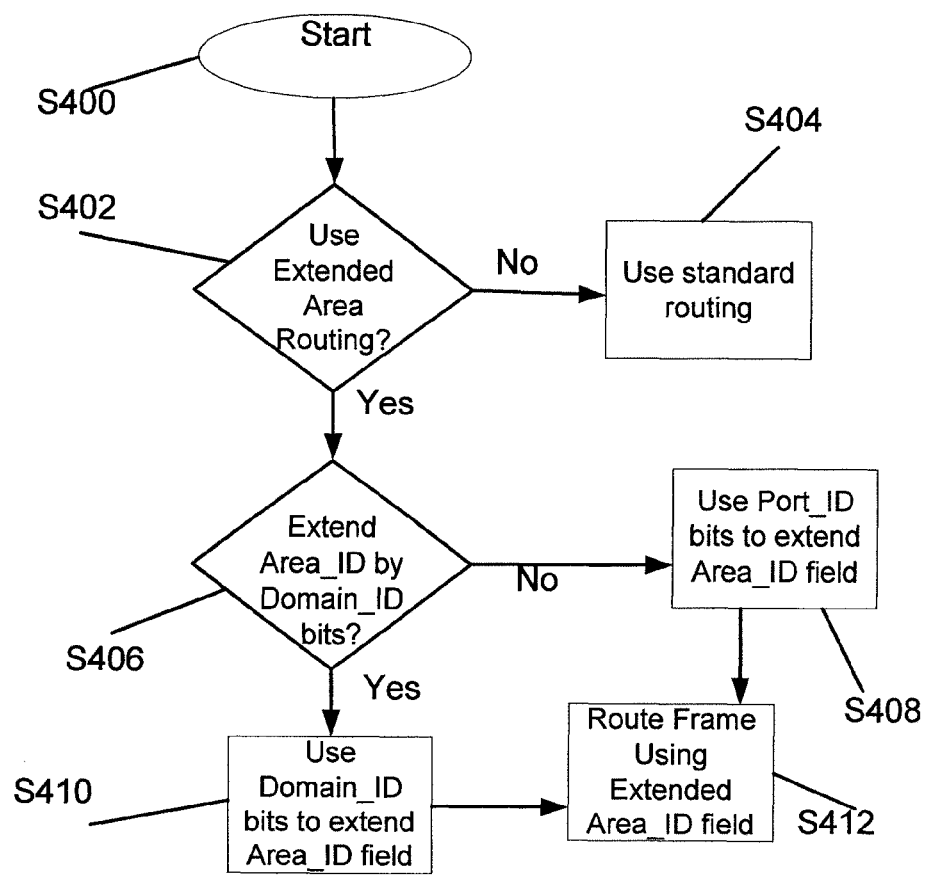
FIGS. 3 and 4 show process flow diagrams for routing frames, according to one embodiment.

FIG. 4 shows yet another flow diagram for extended area routing, according to one embodiment. The process starts in step S400 when a frame is received at a port. In step S402, routing logic (for example, 126, FIG. 1E) determines if extended area routing is to be used for routing the received frame. If not, the frame is routed using standard D_ID fields in step S404.

If extended area routing is to be used, then in step S406, the process determines if Domain_ID field is to be used for extending the Area_ID bits (for example, from 8 bits to 10 bits). If yes, then the lower bits of the Domain_ID (shown as 207B, FIG. 2D) are used to extend the Area_ID 208.

If Domain_ID bits are not used to extend the Area_ID field, then in step S408, the Area_ID field is extended using the lower bits of Port_ID 209 (shown as 211, FIG. 2C). Thereafter, in step S412; the frame is routed using the extended Area_ID field.

In one embodiment, the extension bits allow one to expand the Area_ID field of a standard Fibre Channel header. This allows one to address more than the 256 ports within an assigned domain. In another embodiment, the address bits for expanding the Area_ID field are extracted from either the Domain_ID or the Port_ID fields.

Although the present disclosure has been described with reference to specific embodiments, these embodiments are illustrative only and not limiting. Many other applications and embodiments of the present disclosure will be apparent in light of this disclosure and the following claims.

The invention claimed is:

1. A method for routing Fibre Channel frames, comprising:
   (a) receiving a frame at a port of a switch element;
   (b) determining if the frame is to be routed using extended area routing;
   (c) if extended area routing is not to be used for routing the frame, routing the frame using a standard destination identifier (D_ID) field in a header of the frame; and
   (d) if extended area routing is to be used for routing the frame, identifying a source for obtaining extension bits for expanding an area identification field (Area_ID) in the header, expanding the Area_ID field using the extension bits from the identified source to create an extended Area_ID field, and routing the frame using the extended Area_ID field.

2. The method of claim 1, wherein the identified source is a domain identifier field (Domain_ID).

3. The method of claim 1, wherein the identified source is a port identifier field (Port_ID).

4. The method of claim 1, wherein extended area routing is used if there are more than 256 ports that have to be addressed by a switch that receives the frame.

5. The method of claim 1, wherein the Area_ID field is extended by using 2 extension bits.

6. The method of claim 5, wherein the extended Area_ID field allows a switch that receives the frame to address 1024 devices.

7. A Fibre Channel switch element, comprising:
   a port for receiving a frame; and
   routing logic for:
   (a) determining if the frame is to be routed using extended area routing;
   (b) if extended area routing is not to be used for routing the frame, routing the frame using a standard destination identifier (D_ID) field in a header of the frame; and
   (c) if extended area routing is to be used for routing the frame, identifying a source for obtaining extension bits for expanding an area identification field (Area_ID) in the header, expanding the Area_ID field using the extension bits from the identified source to create an extended Area_ID field, and routing the frame using the extended Area_ID field.

8. The Fibre Channel switch element of claim 7, wherein the identified source is a domain identifier field (Domain_ID).

9. The Fibre Channel switch element of claim 7, wherein the identified source is a port identifier field (Port_ID).

10. The Fibre Channel switch element of claim 7, wherein extended area routing is used if there are more than 256 ports that have to be addressed by the switch element.

11. The Fibre Channel switch element of claim 7, wherein the Area_ID field is extended by using 2 extension bits.

12. The Fibre Channel switch element of claim 7, wherein the extended Area_ID field allows the switch to address 1024 devices.

13. A method for routing Fibre Channel frames, comprising:
   (a) receiving a frame at a port of a Fibre Channel switch element;
   (b) determining if extended area routing is used based on the switch element addressing a certain number of ports;
   (c) if extended area routing is not to be used for routing the frame, routing the frame using a standard destination identifier (D_ID) field in a header of the frame; and (d) if extended area routing is to be used for routing the frame, determining if extension bits from a domain identifier field (Domain_ID) in the header or a port identifier field (Port_ID) in the header are used for expanding an area identification field (Area_ID) in the header, expanding the Area_ID field using the extension bits from the Domain_ID or from the Port_ID to create an extended Area_ID field, and routing the frame using the extended Area_ID field.

14. The method of claim 13, wherein extended area routing is used if there are more than 256 ports that have to be addressed by the switch element.

15. The method of claim 13, wherein the Area_ID field is extended by using 2 extension bits.

16. The method of claim 15, wherein the extended Area_ID field allows the switch element to address 1024 devices.

17. The method of claim 13, wherein when bits from the Port_ID field are used for extending the Area_ID field, then 2 bits from the Port_ID field are used as extension bits.

18. The method of claim 17, wherein after using 2 bits as extension bits, remaining 6 bits of the Port_ID field are used as a virtual identifier (NPIV_ID) to assign more than one virtual address to a same port.

19. The method of claim 13, wherein a routing logic module at the port of the Fibre Channel switch element determines if extended area routing is used for routing the frame.

20. The method of claim 13, wherein when extended area routing and domain based routing is used to route the frame, then lower Domain_ID field bits are used to extend the Area_ID field.

* * * * *

UNITED STATES PATENT AND TRADEMARK OFFICE
CERTIFICATE OF CORRECTION

| | | |
|---|---|---|
| PATENT NO. | : 7,773,629 B1 | Page 1 of 1 |
| APPLICATION NO. | : 12/135973 | |
| DATED | : August 10, 2010 | |
| INVENTOR(S) | : Frank R. Dropps et al. | |

It is certified that error appears in the above-identified patent and that said Letters Patent is hereby corrected as shown below:

On the title page, item (57), in "Abstract", in column 2, line 2, after "The" insert -- method --.

In column 2, line 25, after "according" insert -- to --.

In column 4, line 2, after "of" insert -- a --.

Signed and Sealed this
Fourth Day of January, 2011

David J. Kappos
*Director of the United States Patent and Trademark Office*